(12) United States Patent
Hirasawa et al.

(10) Patent No.: US 7,177,027 B2
(45) Date of Patent: Feb. 13, 2007

(54) AUTONOMOUS ULTRA-SHORT OPTICAL PULSE COMPRESSION, PHASE COMPENSATING AND WAVEFORM SHAPING DEVICE

(75) Inventors: Masakatsu Hirasawa, Tokyo (JP); Mikio Yamashita, Hokkaido (JP)

(73) Assignee: Japan Science and Technology Agency, Saitama (JP)

( * ) Notice: Subject to any disclaimer, the term of this patent is extended or adjusted under 35 U.S.C. 154(b) by 178 days.

(21) Appl. No.: 10/514,474

(22) PCT Filed: Dec. 9, 2002

(86) PCT No.: PCT/JP02/12855

§ 371 (c)(1),
(2), (4) Date: Nov. 16, 2004

(87) PCT Pub. No.: WO03/098328

PCT Pub. Date: Nov. 27, 2003

(65) Prior Publication Data

US 2006/0033923 A1 Feb. 16, 2006

(30) Foreign Application Priority Data

May 17, 2002 (JP) ............................. 2002-143884

(51) Int. Cl.
*G01B 9/02* (2006.01)
*G01J 3/45* (2006.01)

(52) U.S. Cl. .................................................. 356/451
(58) Field of Classification Search ................ 356/450, 356/451
See application file for complete search history.

(56) References Cited

U.S. PATENT DOCUMENTS

| 6,633,386 B2* | 10/2003 | Walmsley et al. ........... 356/450 |
| 6,859,275 B2* | 2/2005 | Fateley et al. ............... 356/330 |
| 2002/0057431 A1* | 5/2002 | Fateley et al. ............... 356/330 |
| 2003/0025911 A1* | 2/2003 | Walmsley et al. ........... 356/450 |
| 2003/0062422 A1* | 4/2003 | Fateley et al. ............... 235/494 |
| 2005/0024640 A1* | 2/2005 | Fateley et al. ............... 356/330 |
| 2006/0056468 A1* | 3/2006 | Dantus et al. ................. 372/28 |

FOREIGN PATENT DOCUMENTS

JP 2002-131710 5/2002

OTHER PUBLICATIONS

Hirasawa et al. "Femtosecond Optical-Pulse Characterization by a Modified-SPIDER Technique and Feedback Phase Control" Quantum Effects and Related Physical Phenomena, Abstracts; Dec. 2001, p. 54, TRANSLATION.*
Hirasawa et al. "Sensitivity improvement of spectral phase interferometry for direct electric-field reconstruction for the characterization of low-intensity femtosecond puses" Jul. 16, 2002, Applied Physics B S225-S229.*
Yamane et al. "Optical pulse compression to 3.4 fs in the monocycle region by feedback phase compensation" Nov. 15, 2003 Optics Letters, vol. 28, No. 22, pp. 2258-2260.*
M. Hirasawa et al.; "1-5-2 Kodo Henkei SPIDER-ho niyoru Femto-Byo Hikari-Pulse no Iso Kettei to Feedback Iso Seigyo", Ryoshi Koka To no Butsuri Gensho, Yokoshu, 2001, No. 12, p. 54. Cited in the int'l. search report.
M. Hirasawa et al.; "27a-ZE-6 Kokando Henkei SPIDER-ho niyoru Hikari-Pulse no Iso Kettei to Feedback Chirp-hosho", Dai 49, Kai Oyo Butsuri Kankei Rengo Koenkai Koen Yokoshu, Mar. 27, 2002, separate vol. 3, p. 1061. Cited in the int'l. search report.

M. Hirasawa et al.; "11p-P4-10 Kokando Henkei SPIDER Iso Sokuteiho niyoru Teikyodo Hikari-Fiber Shursuryoku Pulse no Keisoku", Dai 62 Kai Extended abstracts; the Japan Society of Applied Physics, 2001, 09, separate vol. 3, p. 815. Cited in the int'l. search report.

Reimei Ri et al.; "SPIDER niyoru 5.0fs Hikari-Pulse no Furihaba Iso Sokutei", Dai 48 Kai Oyo Butsuri Kankei Rengo Gakkai Koenkai Koen Yokoshu, 2001. 03, separate vol. 3, p. 1091. Cited in the int'l. search report.

* cited by examiner

*Primary Examiner*—Gregory J. Toatley, Jr.
*Assistant Examiner*—Patrick Connolly
(74) *Attorney, Agent, or Firm*—Westerman, Hattori, Daniels & Adrian, LLP.

(57) ABSTRACT

Disclosed is an apparatus for autonomously compressing, phase-compensating and waveform-shaping an ultrashort light pulse that is fast and high in sensitivity in compensating for phase fluctuations and allows the use of a usual laser light source that is low in light intensity and has large temporal fluctuations in phase. The apparatus comprises: a pulsed light source (2); a spectroscopic spatial dispersing device (4) for spatially dispersing a light pulse (3) emitted from the pulsed light source (2) into spectral components thereof; a spatial light modulator (5) for adding a phase to each of the spectral components of the spatially dispersed light pulse (3); a multiplexer (6) for combining the phase added spectral components of the light pulse (3) together to form a composite output light pulse (7); a modified SPIDER device (8) for forming a spectral interference figure from a portion of the composite output light pulse (7); and a feedback device (9) for detecting a spectral phase from the spectral interference figure and feeding a signal representing a difference between the detected spectral phase and a pre-established phase back to the spatial light modulator (5). The modified SPIDER device (8) comprises: a pulsed light source for a chirped light pulse (8*a*); a delay unit (8*c*) for delaying a light pulse (8*b*) from the pulsed light source (8*a*) with an adjustable delay time; a dispersive medium (28) for forming a chirped light pulse (29) from the light pulse whose delay time is adjusted by the delay unit (8*c*); a replica pulse former (24) for forming from a portion of the output light pulse (7) a pair of replica light pulses (24*a*, 24*b*) one delayed after the other; a nonlinear optical crystal (31) for frequency-mixing the two replica pulses (24*a*, 24*b*) with the chirped light pulse (29); a spectrometer (8*e*) for forming an interference figure of the resultant two frequency-mixed replica light pulses; and an image reader (8*f*) for reading the interference figure of the two frequency-mixed replica light pulses.

10 Claims, 14 Drawing Sheets

(a)

(b)

(a)

(b)

| Number of Pulse Integrated | Detection Limit | Factor of Sensitivity Improvement |
|---|---|---|
| 1 pulse | 10nJ | 10 (Times) |
| 5,000 pulses | 0.1nJ | 80 (Times) |
| 100,000 pulses | 0.03nJ | 100 (Times) |

$\Delta f=10THz$ (a)

(b)

(c)

(a)

(b)

AUTONOMOUS ULTRA-SHORT OPTICAL PULSE COMPRESSION, PHASE COMPENSATING AND WAVEFORM SHAPING DEVICE

TECHNICAL FIELD

The present invention relates to an autonomous ultrashort light pulse compression, phase compensation and waveform shaping apparatus in which use is made of a spatial light modulator for a phase compensation device indispensable to the generation of ultrashort light pulses in an ultrabroad band and of a modified SPIPER method as an improvement over the SPIDER method for determining the spectral phases of a light pulse generated.

BACKGROUND ART

The ultrashort light pulse compression technique, which allows realizing a minimum time duration that humankind can ever achieve, is yielding new discoveries and new technologies in so far unknown spheres of science with the use of ultrashort light pulses. Also, the ultrashort light pulse phase compensation technique with the ability to provide a train of light pulses with a controlled amount of phase compensation that varies with time commences being applied to various types of modulation spectroscopy and optical communication. Further, the ultrashort light pulse waveform shaping technique, which permits a light pulse to be shaped in any waveform as desired, is becoming indispensable in the elucidation of an elementary chemical reaction process and a biological reaction mechanism.

Heretofore, the ultrashort light pulse compression, the ultrashort light pulse phase compensation and the ultrashort light pulse waveform shaping have been attained upon phase-compensating each of spectral components of a light pulse generated by a pulsed light source and then adding together these phase-compensated spectral components.

For phase compensation, there are methods using a stationary optical element such as a prism pair, a grating pair or a dielectric multi-layer film mirror. However, since the phase compensation by these methods is stationary and, if dynamic, is not autonomous, it can be only effective where the phases of the spectral components of a light pulse are known beforehand and also temporally constant.

There is also a method for phase compensation by means of a 4-f pulse shaper using a SLM (space light modulator or spatial light modulator). See, for example, JP 2002-131710 A published May 9, 2002 on a patent application filed in the same inventorship as the present patent application. The method allows the amount of phase modulation to be varied dynamically and an optimum amount of phase modulation to be determined on a trial and error basis by using a simulated annealing or a genetic algorithm technique. However, since there need be a considerably large number of light pulse trains and a plenty of time before a phase determination is made, the method is found only efficient where the phases of the spectral components of a light pulse are temporally constant.

Thus, a problem in the prior art apparatus is that it has been necessary to use a light source only after determination is made in detail of phase information of a light pulse that the light source generates. Also, to reduce temporal fluctuations in phase of individual spectral components of a light pulse, its light source must have been equipped with a control system of extremely high grade. Further, such temporal fluctuations in phase if reduced by using a light source with a high degree of controllability have left the problem unresolved that the continuation time in which the ultrashort light pulse compression, phase compensation and waveform shaping can continuously be performed and accomplished is short, because of the unavoidable long-term fluctuation in phase.

In an effort to solve these problems, a method has recently been tried wherein a portion of output light pulses are taken out and these phases are continuously measured to feed the results back to a spatial light modulator so that a fluctuation in phase of the ultrashort light pulses if brought about is quickly compensated for autonomously (See, for example, JP 2002-131710 A above of the present inventors).

In this autonomous phase compensation method, phases are measured using an autocorrelation, a FROG (frequency resolved optical grating) or a SPIDER (Spectral Phase Interferometry for Direct Electric field Reconstruction) technique.

Of these techniques, however, the autocorrelation and FROG techniques have presented the problem that this method is so time-consuming that a usual laser light source whose temporal fluctuations in phase are large generally tend to fluctuate in phase during the measurement.

In the SPIDER method, two replica light pulses of an output light pulse are shared from the output light pulse and the two replica light pulses are delayed one after the other. The two light pulses delayed one after the other and a chirped light pulse shared from the output light pulse are introduced into a nonlinear optical crystal wherein the two replica light pulses have frequencies mixed with different frequencies in the chirped light pulse. The resultant frequency-mixed two replica light pulses are interfered with each other in a spectrometer to form an interference figure, from whose fringe spacing phase information of the output light pulse is extracted. See literature: IEEE Journal of Quantum Electronics, Vol. 35, No. 4, April 1999, p. 501–509. This method is capable of extracting all the spectral phase information at once of a single output light pulse and hence allows phase compensation at high speed. However, the need to form a chirped light pulse upon splitting the single, common output light pulse comes to diminish the intensity of replica light pulses and in turn to reduce the sensitivity at which the phase information can be extracted. The problem has thus been met that the SPIDER method as it is conventional is only effective for an output light pulse that is rather exceedingly high in intensity.

With the conventional ultrashort light pulse compression, phase compensation and waveform shaping apparatus, it is seen, therefore, that where a usual laser light source is used that is low in output light intensity or large in phase fluctuation, it has been impossible to autonomously perform the compression, phase-compensation or waveform-shaping of an ultrashort light pulse.

DISCLOSURE OF THE INVENTION

In view of the problems mentioned above it is an object of the present invention to provide an apparatus which is capable of autonomously performing the compression, phase-compensation or waveform-shaping of an ultrashort light pulse even where a usual laser light source is used that is low in output light intensity or large in phase fluctuation.

In order to achieve the object mentioned above there is provided in accordance with the present invention an autonomous ultrashort light pulse compression, phase compensation and waveform shaping apparatus, characterized in that it comprises: a pulsed light source; a spectroscopic spatial dispersing device for spatially dispersing a light pulse emitted from the pulsed light source into spectral components thereof; a spatial light modulator for adding a phase to each of the spectral components of the spatially dispersed light pulse; a multiplexer or wave adder for combining the phase added spectral components of the light pulse together to form a composite output light pulse; a modified SPIDER device for forming a spectral interference figure from a portion of the composite output light pulse; and a feedback device for detecting spectral phases from the spectral interference figure and feeding a signal representing differences between the detected spectral phases and pre-established phases back to the said spatial light modulator.

In the autonomous ultrashort light pulse compression, phase compensation and waveform shaping apparatus of the present invention, the said modified SPIDER device may specifically be characterized in that it comprises: a pulsed light source for a chirped light pulse; a delay unit for delaying a light pulse from the pulsed light source with an adjustable delay time; an optical dispersive medium for forming a frequency chirped light pulse from the light pulse whose delay time is adjusted by the delay unit; a replica pulse former for forming from a portion of said output light pulse a pair of replica light pulses delayed one after the other; a nonlinear optical crystal for frequency-mixing the two replica pulses with the chirped light pulse; a spectrometer for forming an interference figure of the two frequency-mixed replica light pulses; and an image reader for reading the interference figure of the two frequency-mixed replica light pulses.

Further, there is provided in accordance with the present invention an autonomous ultrashort light pulse compression, phase compensation and waveform shaping apparatus characterized in that it includes: a pulsed light source; a spectroscopic spatial dispersing device for spatially dispersing a light pulse emitted from the pulsed light source into spectral components thereof; a spatial light modulator for adding a phase to each of the spectral components of the spatially dispersed light pulse; a multiplexer for combining the phase added spectral components of the light pulse together to form a composite output light pulse; a modified SPIDER device for forming a spectral interference figure from a portion of the composite output light pulse; and a feedback device for detecting spectral phases from the spectral interference figure and feeding a signal representing a difference between the detected spectral phases and pre-established phases back to the said spatial light modulator, wherein the said modified SPIDER device comprises: a pulsed light source for a chirped light pulse; a delay unit for delaying a light pulse from the pulsed light source with an adjustable delay time; a dispersive medium for forming a chirped light pulse from the light pulse whose delay time is adjusted by the delay unit; a replica pulse former for forming from a portion of said output light pulse a pair of replica light pulses delayed one after the other; a nonlinear optical crystal for frequency-mixing the two replica pulses with the chirped light pulse; a spectrometer for forming an spectral interference figure of the two frequency-mixed replica light pulses; and an image reader for reading the spectral interference figure of the two frequency-mixed replica light pulses.

In the construction of the above mentioned apparatus, the said pulsed light source may have a nonlinear optical dispersive medium for expanding a bandwidth of a light pulse. The said optical dispersive medium preferably comprises a $TF_5$ glass that excels in group velocity dispersion. Also, the said nonlinear optical crystal preferably comprises a BBO crystal that excels in secondary nonlinear optical effect. Further, the said image reader preferably comprises an ICCD (Charge Coupled Device with Image-intensifier).

According to an apparatus so constructed as mentioned above, a light pulse emitted from a pulsed light source is spatially dispersed into spectral components thereof, which are made incident into a spatial light modulator, and by transmitting through it, are added by a phase independently for each of the spectral components. The spectral components added by the phases are combined together to form an output light pulse, a portion of which is taken out into the modified SPIDER device to form there a spectral interference figure, from which a feedback device detects the spectral phases, compares the detected phases with pre-established phases, and feeds differences between them back to the spatial light modulator.

The modified SPIDER device used in the apparatus of the present invention is modified from the conventional SPIDER device by forming a chirped light pulse not from the output light pulse but from another light pulsed source. As forming a chirped light pulse from another light pulsed source, the modified SPIDER device can by no means weaken the intensity of replica light pulses forming from the output light pulse. As this configuration can also enhance the intensity of a chirped light pulse, it becomes possible to heighten the contrast of an interference figure or image produced by the spectrometer from two frequency-mixed replica light pulses. Further, reading the interference figure by means of an ICCD allows all the spectral phases to be detected rapidly and at high sensitivity.

And, the ability of the modified SPIDER device to be able to detect rapidly all the spectral phases at high sensitivity permits a feedback device to feed differences between the detected phases and pre-established phases as the additive phase back to the spatial light modulator rapidly and at high sensitivity.

Further, given the ability of the present invention, autonomously correcting to a desired light pulse, to extract from a single light pulse all its phase information rapidly and at high sensitivity to derive an additive phase that can reconstruct a desired output light pulse and to set such an additive phase in the spatial light modulator in an extremely short period of time that is within 10 seconds at the worst, the apparatus of the present invention is allowed to continue to output a desired light pulse, even if a light pulse caused to fluctuate in spectral phase.

Thus, according to the apparatus of the present invention, since it is rendered possible to compensate for a phase fluctuation rapidly and at high sensitivity, it becomes possible to perform the compression, the phase-compensation and the waveform-shaping of an ultrashort light pulse autonomously, even if a pulsed light source used is a general light source whose output is low in light intensity or temporally fluctuate or otherwise be unstable.

BRIEF DESCRIPTION OF THE DRAWINGS

The present invention will better be understood from the following detailed description and the drawings attached hereto showing certain illustrative forms of implementation of the present invention. In this connection, it should be noted that such forms of implementation illustrated in the accompanying drawings hereof are intended in no way to limit the present invention but to facilitate an explanation and understanding thereof. In the drawings.

FIG. 8 gives graphs showing observed values of the spectral shear and interference figure of two replica light pulses wherein FIG. 8(a) shows results with the test light pulse 1 and FIG. 8(b) shows results with the test light pulse 2;

FIG. 9 gives graphs showing spectral phases: $\phi(v)$ reconstructed from interference figures shown in FIG. 8 wherein FIG. 9(a) shows a reconstructed spectral phase of test light pulse 1 and FIG. 9(b) shows a reconstructed spectral phase of test light pulse 2 and wherein spectral intensities: $|E(v)|$ of the input light pulses found upon their Fourier transformation are also shown;

FIG. 10 gives graphic comparison between SPIDER signal intensities produced by the modified and conventional SPIDER methods, respectively, wherein FIG. 10(a) is a graph plotting input light pulse energy along the abscissa axis and SPIDER signal intensity $D(\omega)$ along the ordinate axis;

FIG. 12(b) shows the spectral phase $\phi(v)$ reconstructed by using the modified-SPIDER signal; and spectral intensity $|E(v)|$ of the input light pulse, and FIG. 12(c) shows the intensity $|E(t)|$, and the phase $\phi(t)$ reconstructed from the $\phi(v)$ and the $|E(v)|$, and shows the input light pulse in time domain reconstructed from the intensity $|E(t)|$ and the phase $\phi(t)$;

FIG. 13(b) shows a spectral phase $\phi(v)$ reconstructed by using the modified SPIDER signal, and spectral intensity $|E(v)|$ of the input light pulse, and FIG. 13(c) shows the intensity $|E(t)|$, and the phase $\phi(t)$ reconstructed from the $\phi(v)$ and the $|E(v)|$, and shows the input light pulse in time domain reconstructed from the intensity $|E(t)|$ and the phase $\phi(t)$.

BEST MODES FOR CARRYING OUT THE INVENTION

Figure 1:
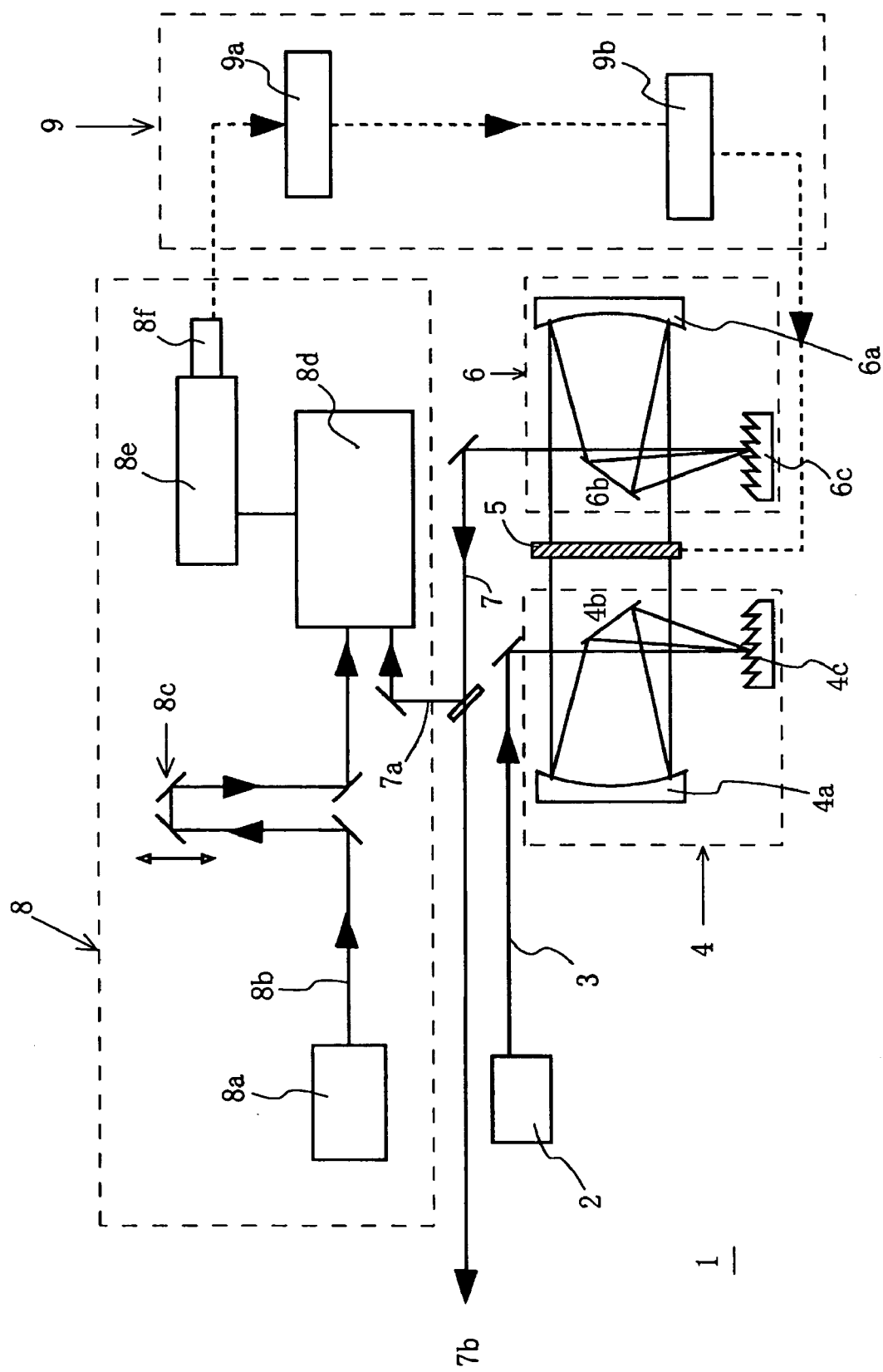
FIG. 1 is a diagram illustrating the makeup of an autonomous ultrashort light pulse compression, phase compensation and waveform shaping apparatus according to the present invention.

Hereinafter, the present invention will be described in detail with reference to certain suitable forms of implementation thereof illustrated in the drawing figures.

Figure 2:
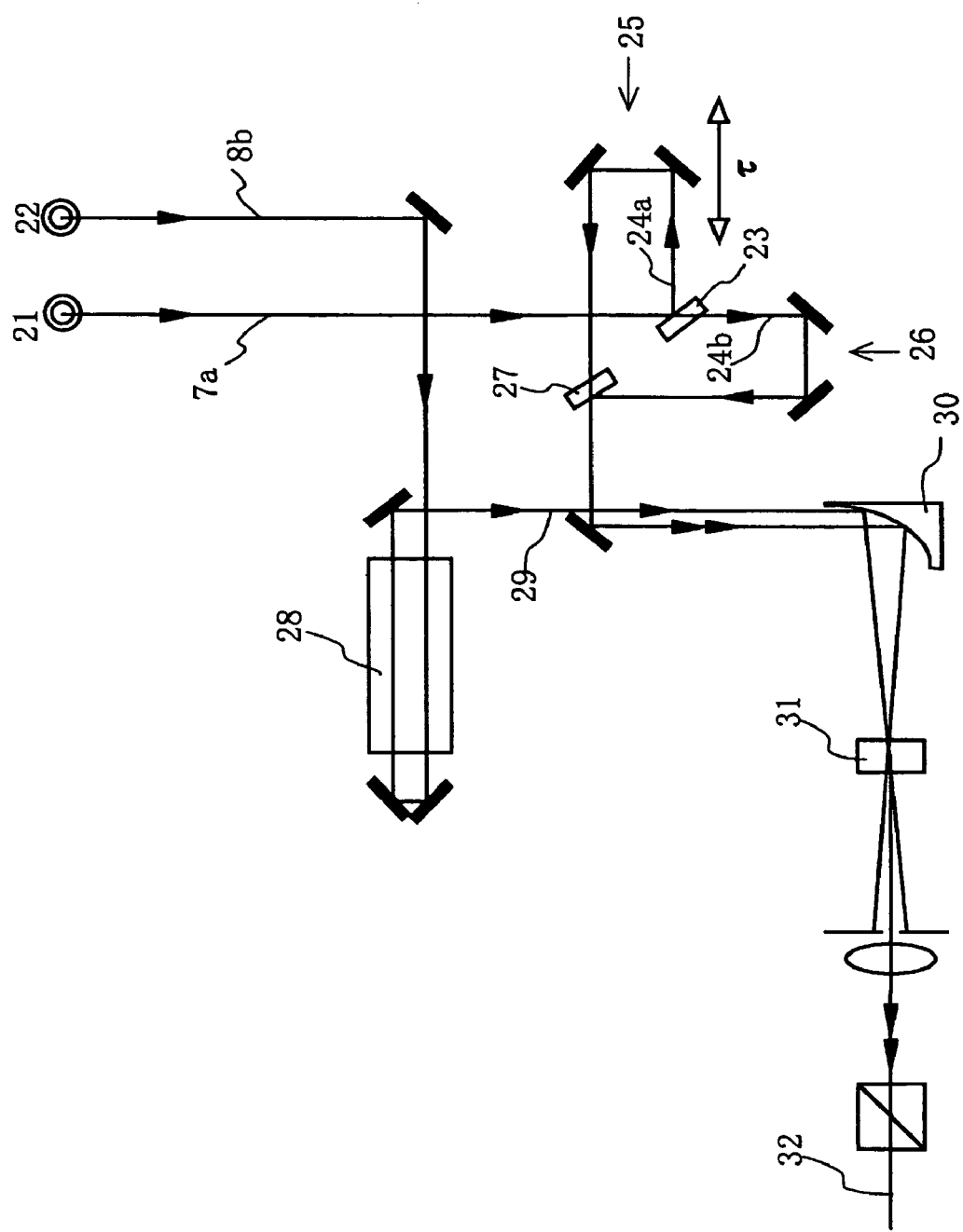
FIG. 2 is a diagram illustrating a detailed makeup of a frequency converter.

Referring first to FIGS. 1 and 2, an explanation is given in respect of the makeup of an autonomous ultrashort light pulse compression, phase compensation and waveform shaping apparatus according to the present invention as well as an operation thereof.

FIG. 1 is a diagram illustrating the makeup of an autonomous ultrashort light pulse compression, phase compensation and waveform shaping apparatus according to the present invention. As shown in the Figure, the autonomous ultrashort light pulse compression, phase compensation and waveform shaping apparatus designated by reference character 1 comprises a pulsed light source 2; a spectroscopic spatial dispersing device 4 for spatially dispersing a light pulse 3 emitted from the light source 2 into spectral components thereof; a spatial light modulator 5 for adding a phase to each of the spectral components of the spatially dispersed light pulse 3; a multiplexer or wave adder 6 for combining the phase added spectral components of the light pulse 3 together to form a composite output light pulse 7; a modified SPIDER device 8 for detecting a phase of each of spectral components of the composite output light pulse 7 to derive its phase information; and a feedback device 9 for feeding the derived phase information back to the spatial light modulator 5.

The pulsed light source 2 may have a nonlinear optical dispersive medium for expanding a bandwidth of a light pulse by transmitting it through the medium. The spectroscopic spatial dispersing device 4 is made of a concave mirror 4a, a mirror 4b and a grating 4c wherein the grating 4c is disposed at the focal plane of the concave mirror 4a via the mirror 4b. The light pulse 3 is dispersed in its wavelengths on the grating 4c, that is, spatially dispersed into its spectral components, and which are collimated by the concave mirror 4a to enter the spatial light modulator 5.

The spatial light modulator 5 is disposed at the focal plane of the concave mirror 4a. Although not shown, the spatial light modulator 5 comprises a planar array of pixels each composed of liquid crystal (LC), through which the spectral components are passed to add a phase to each of the spectral components, such phases being able to set up independently for each of the pixels by selecting a applied voltage on each of the pixels. Thus, it is possible to add a selected phase to an individual one of the spectral components of the light pulse 3 respectively by the spatial light modulator 5.

The multiplexer or wave adder 6 comprises a concave mirror 6a, a mirror 6b and a grating 6c wherein the grating 6c is located at the focal plane of the concave mirror 6a via the mirror 6b. The concave mirror 6a is located at the focal length f from the spatial light modulator 5. The spectral components of the light pulse 3 passed through the spatial light modulator 5 are combined together by the concave mirror 6a and the grating 6c to form a composite output pulse 7.

The spectroscopic spatial dispersing device 4, the spatial light modulator 5 and the multiplexer 6, which are so constructed as mentioned above can be collectively referred to as "4f pulse shaper".

The modified SPIDER device 8 comprises a pulsed light source for a chirped light pulse 8a; a delay unit 8c for delaying a light pulse 8b from the pulsed light source 8a with an adjustable delay time; a frequency converter 8d for receiving the light pulse 8b adjusted by delay time and a light pulse 7a that is a split portion of the output light pulse 7, for forming a pair of replica light pulses of the light pulse 7a, and for forming a pair of frequency-mixed replica light pulses of the light pulse 7a, which are frequency-mixed with different frequencies respectively; a spectrometer 8e adapted to form an interference figure of these two frequency-mixed replica light pulses in their spectral domain; and an imaging unit 8f comprising an ICCD array for reading such an interference figure. Here, the delay unit 8c is adopted to adjust the relative positions of the chirped light pulse and the two replica light pulses on a time axis.

FIG. 2 is a diagram illustrating a detailed makeup of the frequency converter 8d. The frequency converter 8d comprises a first light incident end 21 at which the light pulse 7a is incident; a second light incident end 22 at which the light pulse 8b is incident; a first half mirror 23 for forming two replica light pulses 24a and 24b from the light pulse 7a; a second half mirror 27 for bringing the two replica light pulses 24a and 24b together, a first and a second delay units 25 and 26 for providing an adjusted delay time between the two replica light pulses 24a and 24b; an optical dispersive medium 28 for dispersing the light pulse 8b in frequency to form a chirped light pulse 29; and a parabolic mirror 30 for focusing the chirped light pulse 29 and the replica light pulses 24a and 24b on a nonlinear optical crystal 31.

The light pulse 7a incident at the first light incident end 21 is split by the first half mirror 23 into two replica light pulses 24a and 24b, which pass the separate delay units 25 and 26 respectively, are added together by the second half mirror 27. Here, the delay units 25 and 26 gives a delay time τ between the replica light pulses 24a and 24b. The light pulse 8b incident at the second light incident end 22 reciprocates in the dispersive medium 28 to receive frequency dispersion, thereby becoming a chirped light pulse 29. The mutually separated replica light pulses 24a and 24b with the delay time τ and the chirped light pulse 29 are forcused by the parabolic mirror 30 onto the nonlinear optical crystal 31. Here, the delay unit 8c shown in FIG. 1 acts to adjust the chirped light pulse 29 and the replica light pulses 24a and 24b in time domain so that the center of the chirped light pulse 29 and the center between the two replica light pulses 24a and 24b are made in coincidence with each other, and consequently the replica light pulses 24a and 24b overlap with the different portions of the chirped light pulse 29 respectively and thus have frequencies mixed, namely, are "spectrally sheared" with different frequencies contained in the chirped light pulse 29.

The replica light pulses 24a and 24b frequency-mixed and spectrally sheared with different frequencies in the nonlinear optical crystal 31 are incident on the spectrometer 8e shown in FIG. 1 and are spatially dispersed depending on the spectrum, thereby to form an interference figure on the image reader 8f. The interference figure formed on the image reader 8f is read by the image reader 8f to result in an image data which is transmitted to a computer 9a in the feedback unit 9.

The computer 9a carries out the Fourier transformation of the image data to detect a phase for each of its spectral components of the light pulse 8b, namely to extract its spectral phase data, reconstruct the spectral phases of the light pulse 8b thereby, and transmit the reconstructed spectral phases, namely observed spectral phase values, to a separate computer 9b. The separate computer 9b computes a phase difference between an observed value of such a reconstructed spectral phase and a set value of an input spectral phase and feeds back such phase differences to each pixel in the spatial light modulator 5 to converge an output light pulse 7b to a set value.

Figure 3:
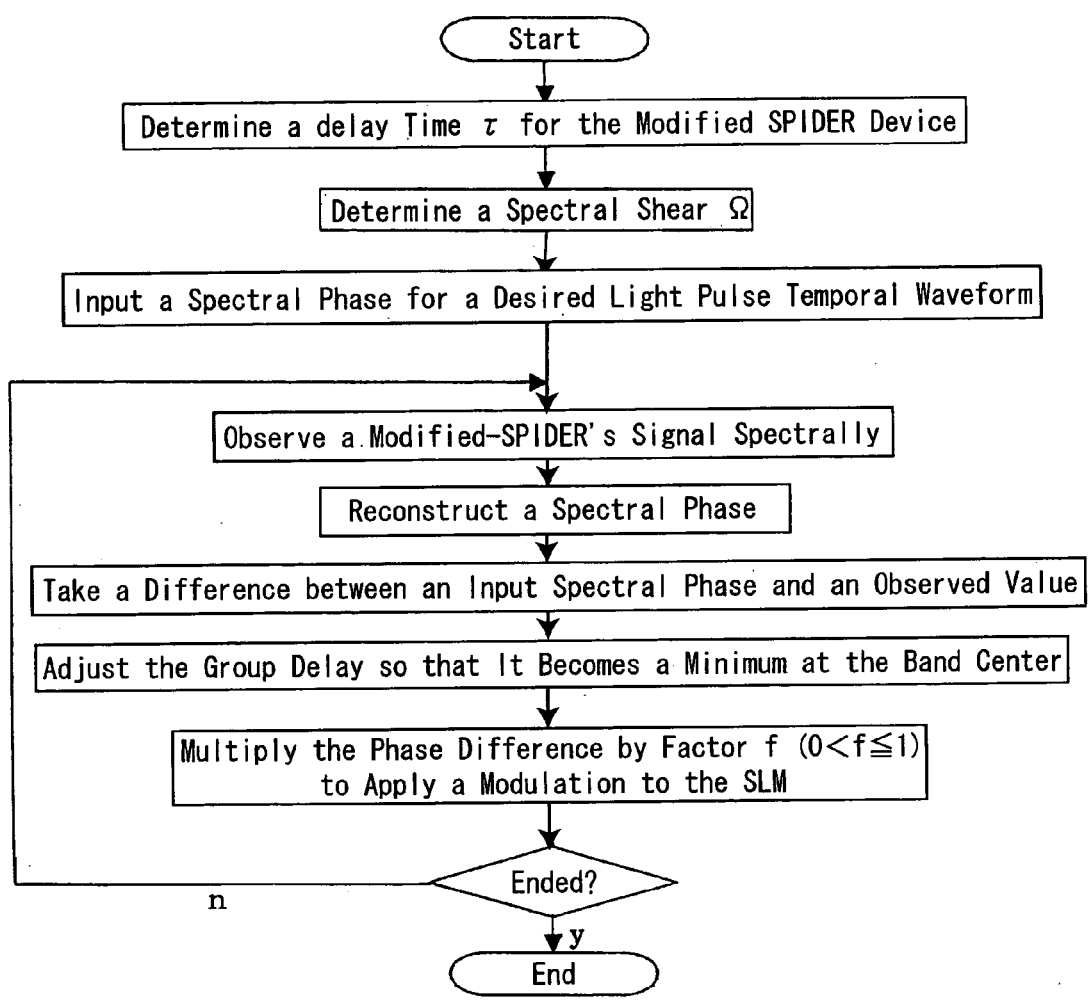
FIG. 3 is a flow chart of a specific algorithm of feedback phase compensation.

A specific algorithm for feedback phase compensation is shown in FIG. 3. FIG. 3 is a flow chart illustrating such a specific algorithm for feedback phase compensation. First, a delay time τ for the modified SPIDER device is determined. Next, a spectral shear (Ω) is determined and a spectral phase of a desired temporal waveform pulse is entered. Here, while the delay time τ can be determined from a distance between two arms of the interference figure, if it remains fixed, its determination step above can be omitted.

Next, signals from the modified SPIDER device are observed by spectrally analyzing, and reconstructing them into spectral phases of a light. Then, differences between input spectral phases and observed spectral phases are taken and the group delay is adjusted so that it becomes a minimum. This difference in phase is multiplied by a factor f(0<f≦1) to apply a modulation to the spatial light modulator 5. This factor f prevents phase oscillations arising at each loop of the feedback phase compensation. Thus, any possible error in the applied voltage to the spatial light modulator 5, namely any possible error in the amount of a parameter for phase modulation can be absorbed by the loop. In this stage, it is judged if the feedback phase compensation has been ended. If the judgment indicates that it has not been ended, the step of spectrally observing a modified-SPIDER's signal and the steps thereafter as mentioned above are again performed. To the contrary, if it is judged that the feedback phase compensation has been ended, the feedback phase compensation is terminated.

Next, the principle of spectral phase reconstruction should be described (for details, see literature: IEEE Journal of Quantum Electronics Vol. 35, No. 4, April 1999, pp 501–509).

Electric field E(t) of a light pulse is expressed as a function of E(ω) that is Fourier transformation of E(t), by equation (1) below.

$$E(t) = \int_0^\infty d\omega E(\omega)\exp(-i\omega t) \tag{1}$$

E(ω) is expressed by equation (2) below.

$$E(\omega) = \int_0^\infty dt E(t)\exp(i\omega t) \tag{2}$$

E(ω) can also be defined by equation (3) below.

$$E(\omega) = |E(\omega)|\exp(i\phi(\omega)) \tag{3}$$

Here, |E(ω)| is a spectral intensity and φ(ω) is a spectral phase. Given |E(ω)| and φ(ω), the shape of a light pulse is determined.

Figure 4:
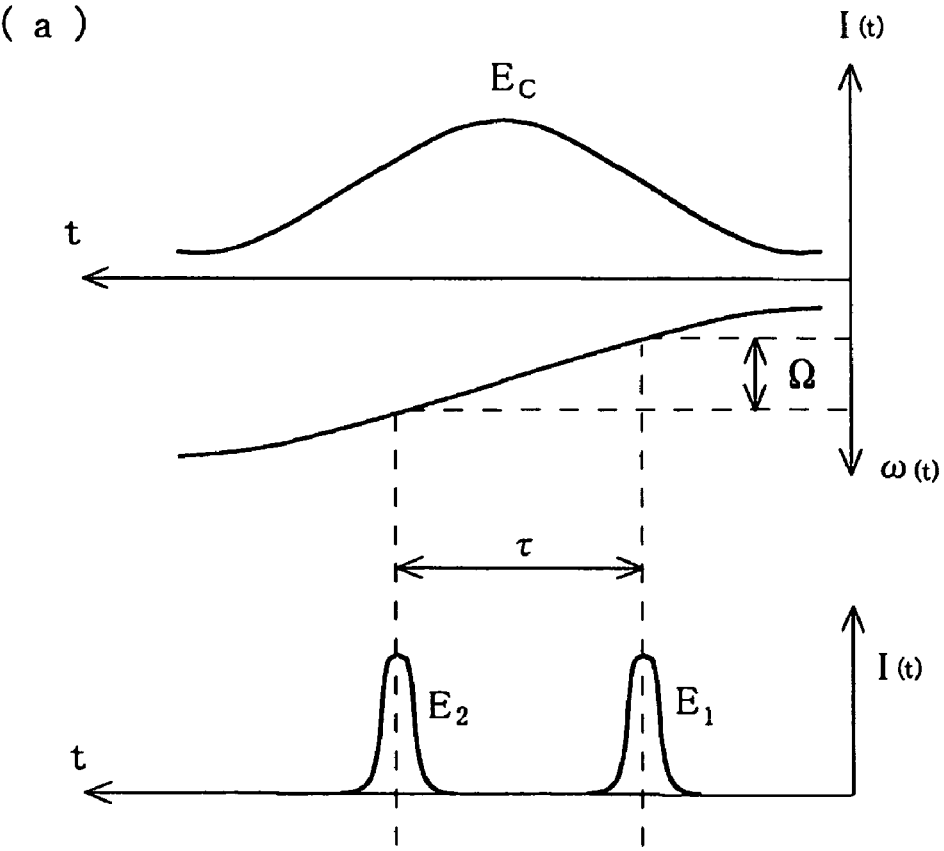
FIG. 4 shows both graphically and diagrammatically the principle of how two replica light pulses can be spectrally sheared.
Figure 4:
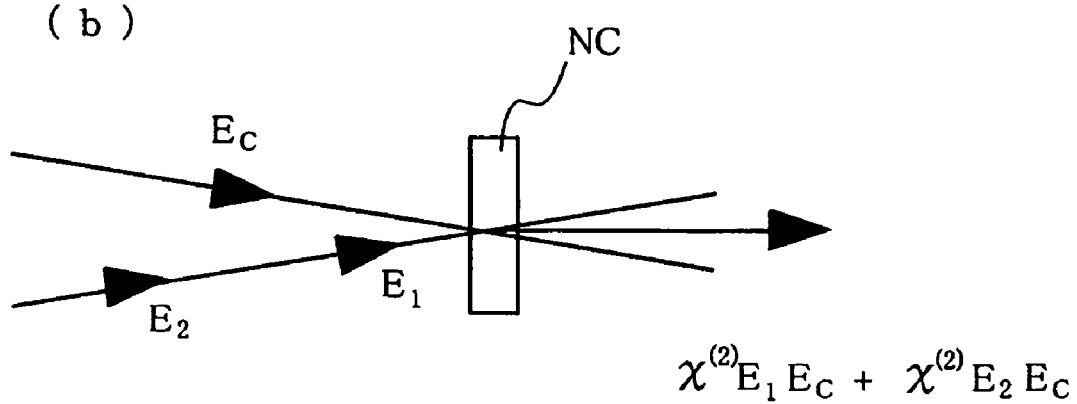

FIG. 4 shows both graphically and diagrammatically the principle of how the two replica light pulses are spectrally sheared. FIG. 4(a) shows the relative positions on the temporal axis of two replica light pulses $E_1$ and $E_2$ to a chirped light pulse Ec and includes a graph for the chirped light pulse Ec, also showing a frequency distribution of the chirped light pulse Ec. As shown in FIG. 4(b), if the two replica light pulses $E_1$ and $E_2$ having relative delay time τ and the chirped light pulse Ec are incident on a secondary nonlinear optical crystal NC being overlapped on the time axis as shown, there are then produced coupled waves $\chi^{(2)} E_1 Ec$ and $\chi^{(2)} E_2 Ec$ where $\chi^{(2)}$ is a secondary nonlinear optical susceptibility. As shown in FIG. 4(a), there being a difference $\Omega$ between the frequency of Ec coupled to $E_1$ and the frequency of Ec coupled to $E_2$, $E_1$ and $E_2$ are spectrally sheared with frequency difference $\Omega$ and the spectrally sheared $E_1$ and $E_2$ which are indicated by $^sE_1$ and $^sE_2$ are represented by equations (4) and (5) below, respectively.

$$^sE_1(\omega) \propto |E(\omega-\Omega)|\exp[i\{\phi(\omega-\Omega)-\tau\}] \quad (4)$$

$$^sE_2(\omega) \propto |E(\omega)|\exp[i\phi(\omega)] \quad (5)$$

Here, the frequency of $^sE_2$ is assumed to be $\omega$. Overlapping $^sE_1$ and $^sE_2$ each upon spatial dispersion with a spectrometer or the like gives rise to an interference figure $D(\omega)$ expressed by equation (6) below.

$$D(\omega) \propto |E(\omega-\Omega)|^2 + |E(\omega)|^2 + \quad (6)$$
$$2|E(\omega-\Omega)||E(\omega)|\cos\{\phi(\omega-\Omega)-\phi(\omega)-\tau\omega\}$$

Figure 5:
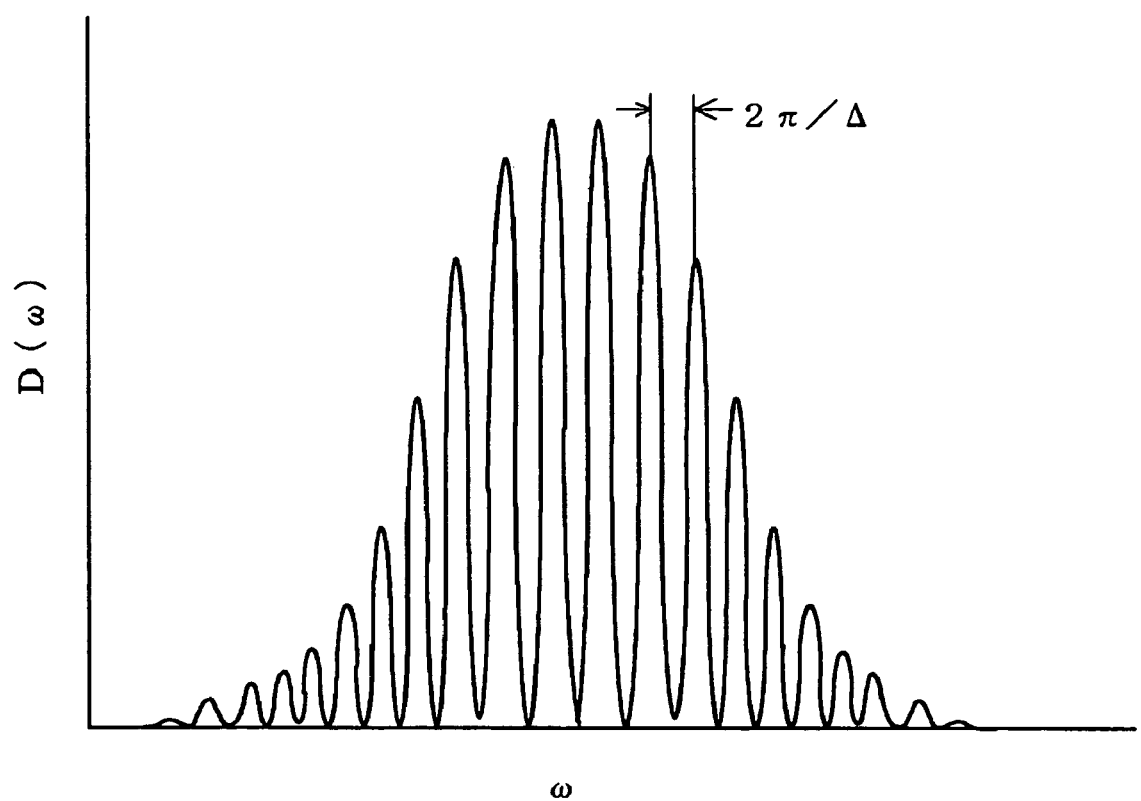
FIG. 5 is a graph illustrating an example of interference figure $D(\omega)$.

FIG. 5 is a graph showing an example of interference figure $D(\omega)$. Since the interference figure $D(\omega)$, which is in equation (6) above, gives a maximum value at each time when the cosine phase term $\Delta=\phi(\omega-\Omega)-\phi(\omega)-\tau\omega$ takes a integer multiple of $2\pi$, it forms interference fringes. Then $\omega$-dependency of $\Delta$ can be obtained from the spacing of interference fringes. Since $\Omega$ and $\tau$ are known, $\omega$-dependency of differential phase, that is, $\Delta\phi=\phi(\omega-\Omega)-\phi(\omega)$ can be obtained from the $\omega$-dependency of $\Delta$. Then it is possible to obtain the spectral phase $\phi(\omega)$ defined by equation (3) from the $\omega$-dependency of differential phase. Then the spectral phase reconstruction can be achieved from the spectral phase $\phi(\omega)$. The spacing of interference fringes can be obtained by the Fourier transformation of interference figure $D(\omega)$. See literature: J. Opt. Soc. Am. Vol. 72, No. 1, January 1982, pp 156–160.

Figure 6:
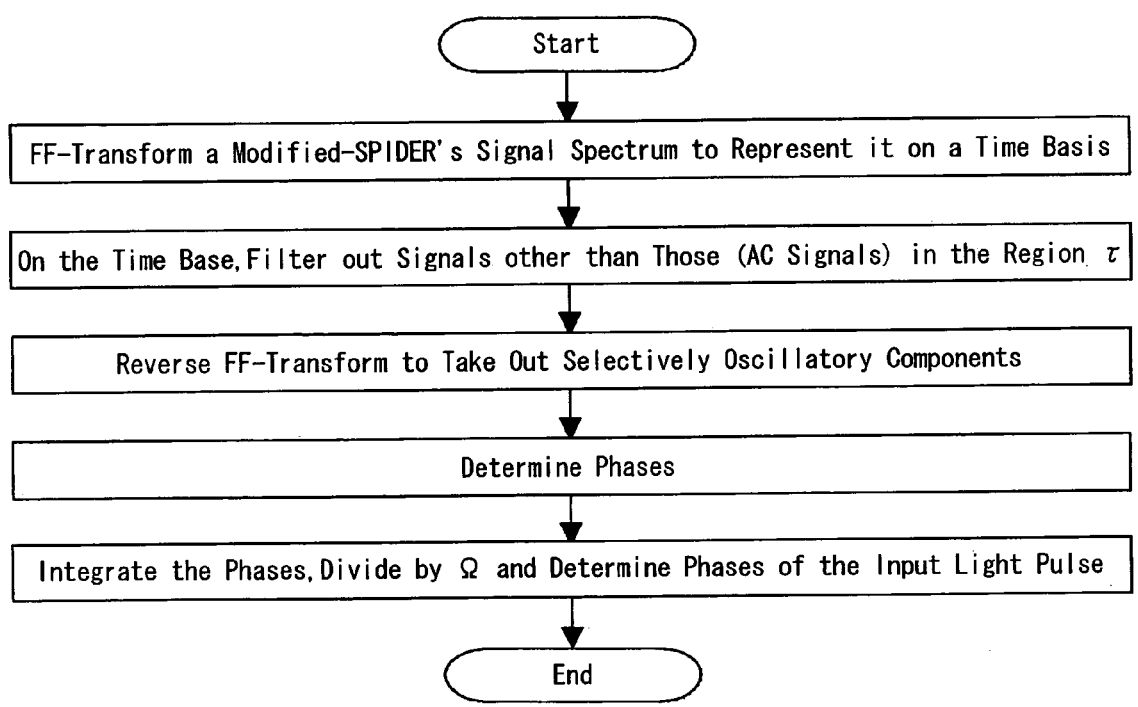
FIG. 6 is a flow chart illustrating a procedure in which a spectral phase can be reconstructed.

A specific procedure for spectral phase reconstruction is shown in FIG. 6. FIG. 6 is a flow chart illustrating a procedure for spectral phase reconstruction.

First, the modified SPIDER's signal spectrum is subjected to FFT (fast Fourier transformation) and the resultant signals are transferred into the time domain. Then, signals other than those in the region of $\tau$ (AC signals) are filtered to be removed. A resultant time domain waveform is subjected to inverse FFT, and oscillatory components extracted from the inverse FFT data are used to determine the phases. Then the phases are integrated, and the integrated results are divided by $\Omega$ to determine phases of the input light pulse, thereby spectral phase reconstruction is completed.

Now, a specific example of the present invention is given.

Figure 7:
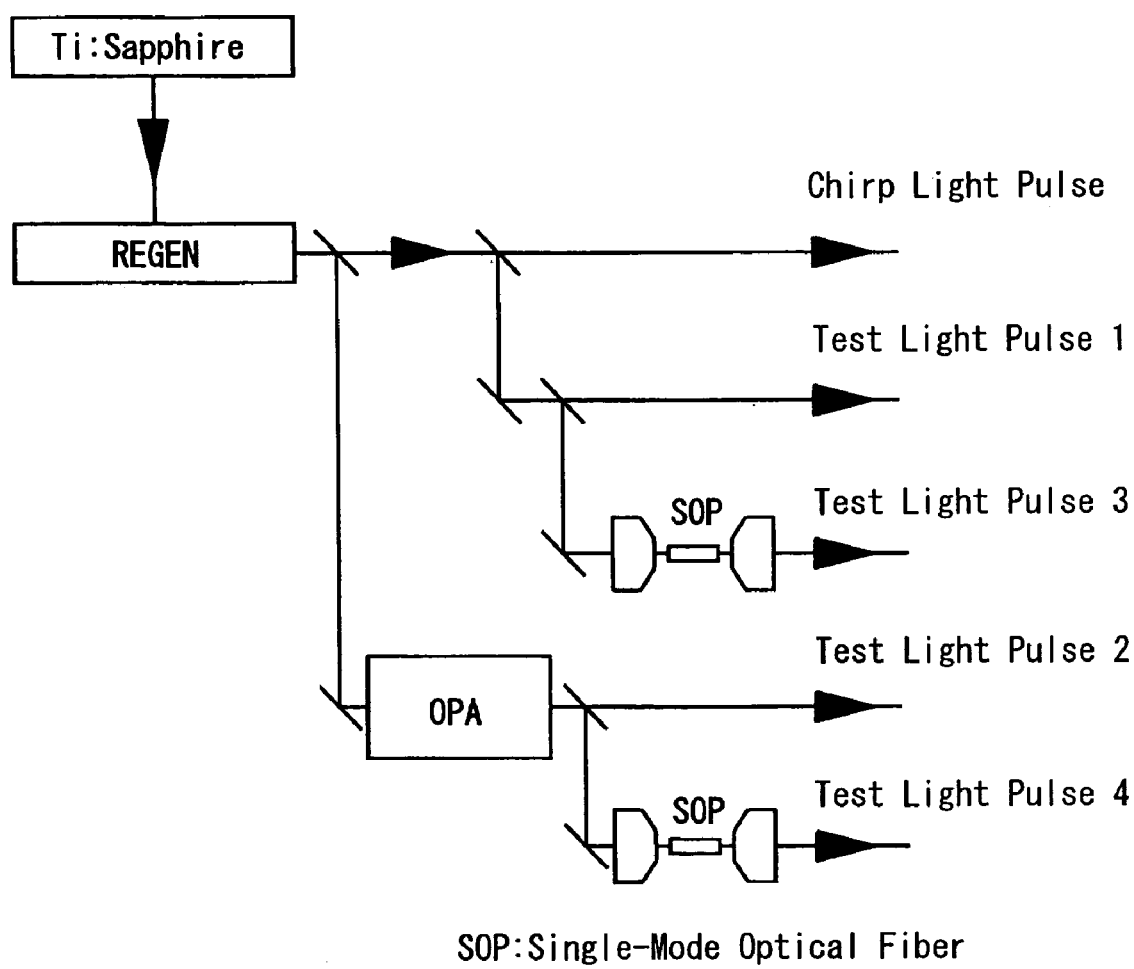
FIG. 7 is a diagram illustrating characteristics of an input light pulse and a method of its forming in an embodiment of the present invention.

FIG. 7 is a diagram illustrating characteristics of an input light pulse and a method of its forming in an embodiment of the present invention. In this embodiment, the pulsed light source was a Ti: sapphire laser light source and an input light pulse emitted from the Ti: sapphire laser light source was passed through a regenerative amplifier (REGEN) to form a high intensity, ultrashort light pulse that had a central wavelength of 800 nm, a repetition rate of 1 kHz and a band width $\Delta f=10$ THz. A chirped light pulse was formed from the above Ti: sapphire laser light source by directly splitting from it, and it had 1.2 µJ/pulse at the maximum.

A test light pulse 1 was formed from split light of the high intensity, ultrashort light pulse by attenuating it with an ND filter, and had 500 nJ/pulse at the maximum. A test light pulse 2 was formed from split light of the high intensity, ultrashort light pulse by introducing it into an optical parametric amplifier (OPA) and attenuating idler light from it with an ND filter, and had a central wavelength of 1100 nm, a bandwidth $\Delta f=10$ THz, and 400 nJ/pulse at the maximum. A test light pulse 3 was formed by passing split light of the high intensity, ultrashort light pulse through a single-mode quartz fiber (SOP: core diameter of 2.7 µm and a length of 3 mm) to have the bandwidth broadened by its self-phase modulation effect, and had a central wavelength of 800 nm, a bandwidth $\Delta f=20$ THz, and 3.6 nJ/pulse. A test light pulse 4 was formed by passing idler light from an optical parametric amplifier (OPA) through a single-mode quartz fiber (core diameter of 2.7 µm and a length of 3 mm) to have the bandwidth broadened by its self-phase modulation effect, and had a central wavelength of 1100 nm, a bandwidth $\Delta f=50$ THz, and 14 nJ/pulse.

Figure 8:
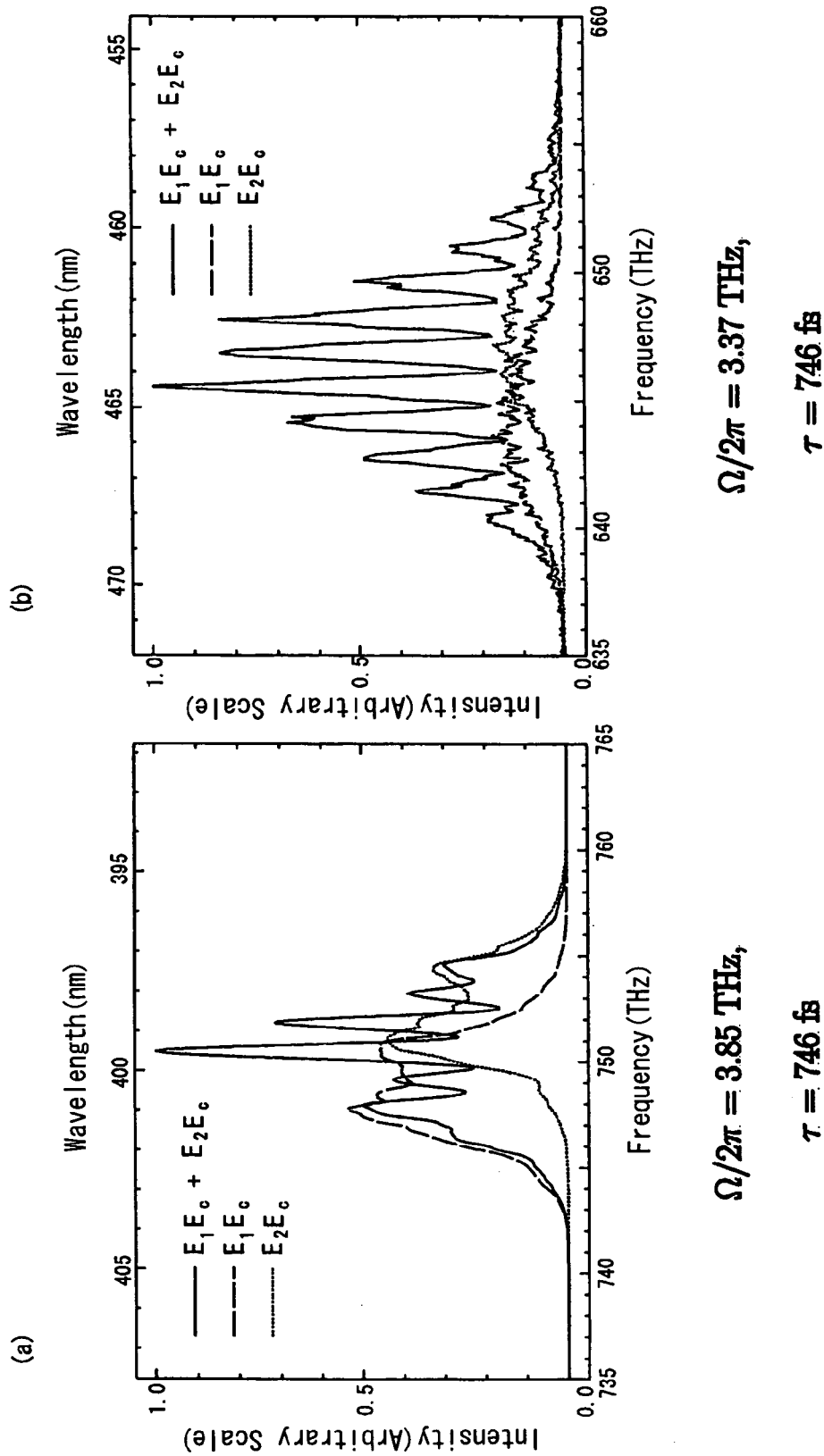

FIG. 8 gives graphs showing observed values of the spectral shear and interference figure of two replica light pulses. The graph of FIG. 8(a) shows results with the test light pulse 1 and the graph of FIG. 8(b) shows results with the test light pulse 2. In FIG. 8(a), the two replica light pulses $E_1$ and $E_2$ are shown having a relative delay time $\tau=746$ fs and a spectral shear frequency $\Omega/2\pi=3.85$ THz. The broken line indicates a spectral distribution of coupled wave of replica light pulse $E_1$ and chirped light pulse Ec while the dotted line indicates a spectral distribution of coupled wave of replica light pulse $E_2$ and chirped light pulse Ec, and it is seen that the two replica light pulses $E_1$ and $E_2$ are spectrally sheared. The solid line indicates an interference figure $D(\omega)$ of the spectrally sheared replica light pulses $E_1$ and $E_2$, and it is seen that clear interference fringes are produced, reflecting the spectral phase of the test light pulse 1.

In FIG. 8(b), the two replica light pulses $E_1$ and $E_2$ are shown having a relative delay time $\tau=746$ fs and a spectral shear frequency $\Omega/2\pi=3.37$ THz. The broken line indicates a spectral distribution of coupled wave of replica light pulse $E_1$ and chirped light pulse Ec while the dotted line indicates a spectral distribution of coupled wave of replica light pulse $E_2$ and chirped light pulse Ec, and it is seen that the two replica light pulses $E_1$ and $E_2$ are spectrally sheared. The solid line indicates an interference figure $D(\omega)$ of the spectrally sheared replica light pulses $E_1$ and $E_2$, and it is seen that clear interference fringes are produced, reflecting the spectral phase of the test light pulse 2.

While test light pulses 1 and 2 have their respective central wave lengths of 800 nm and 1100 nm and are each a low energy light pulse as low as 500 nJ, it is seen from FIG. 8 that even for such a low energy light pulse the apparatus of the present invention is capable of forming clear interference figures $D(\omega)$ over a broad band.

Figure 9:
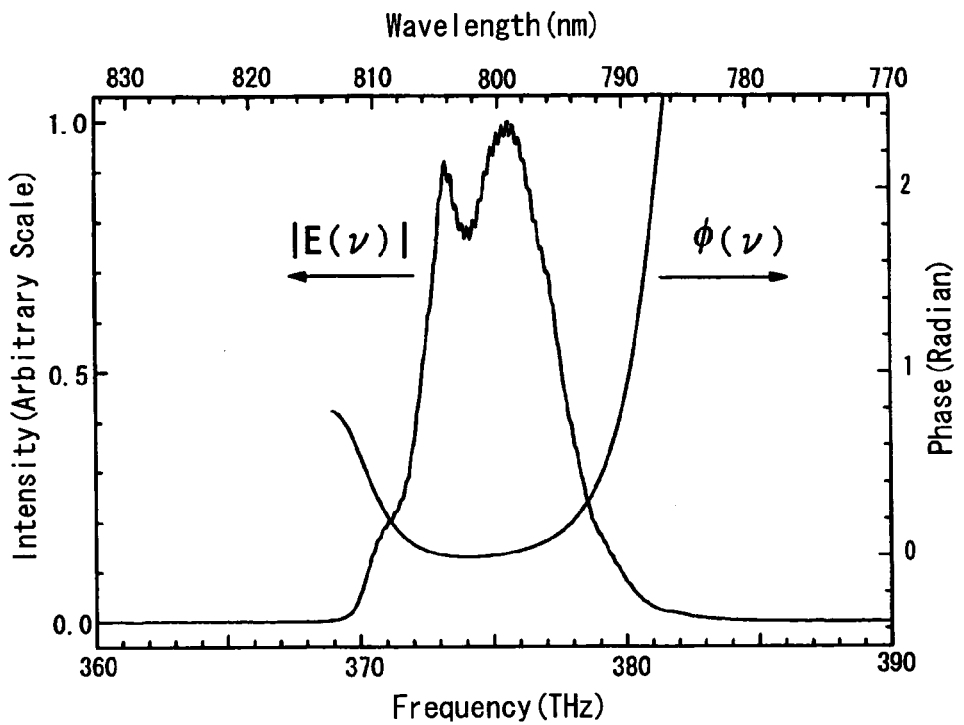
Figure 9:
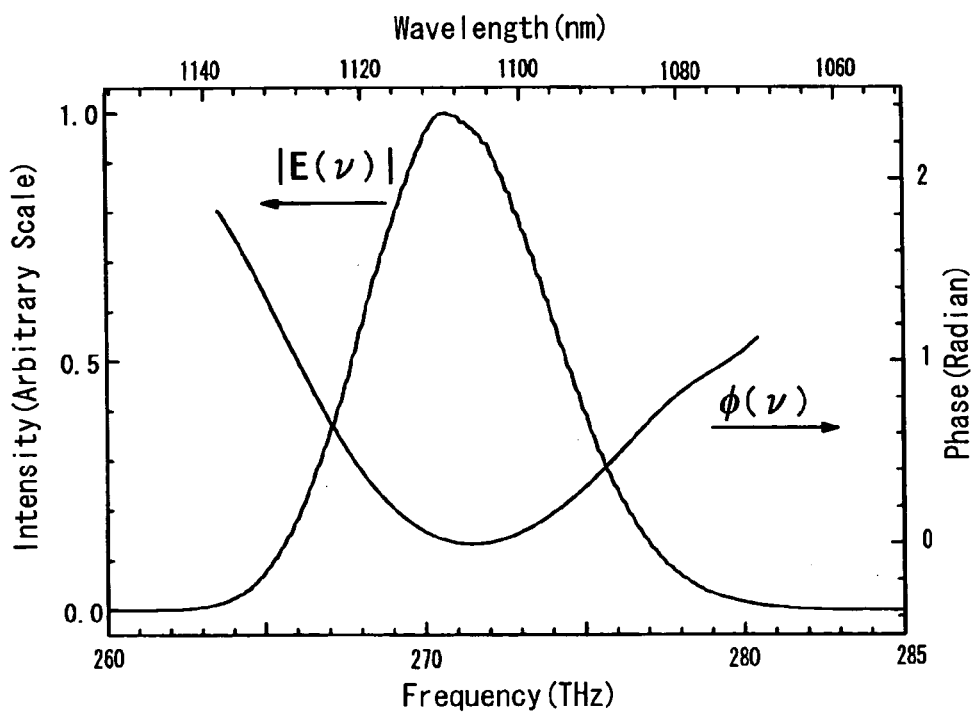

FIG. 9 gives graphs showing spectral phases: $\phi(v)$ reconstructed from interference figures shown in FIG. 8 wherein FIG. 9(a) shows a reconstructed spectral phase of test light pulse 1 and FIG. 9(b) shows a reconstructed spectral phase of test light pulse 2. In the graphs, spectral intensities: $|E(v)|$ of the input light pulses found upon their Fourier transformation are also shown. Spectral phase $\phi(v)$ (where $v=\omega/2\pi$) was obtained from the Fourier transformation of the interference figure $D(\omega)$ shown in FIG. 8.

Figure 10:
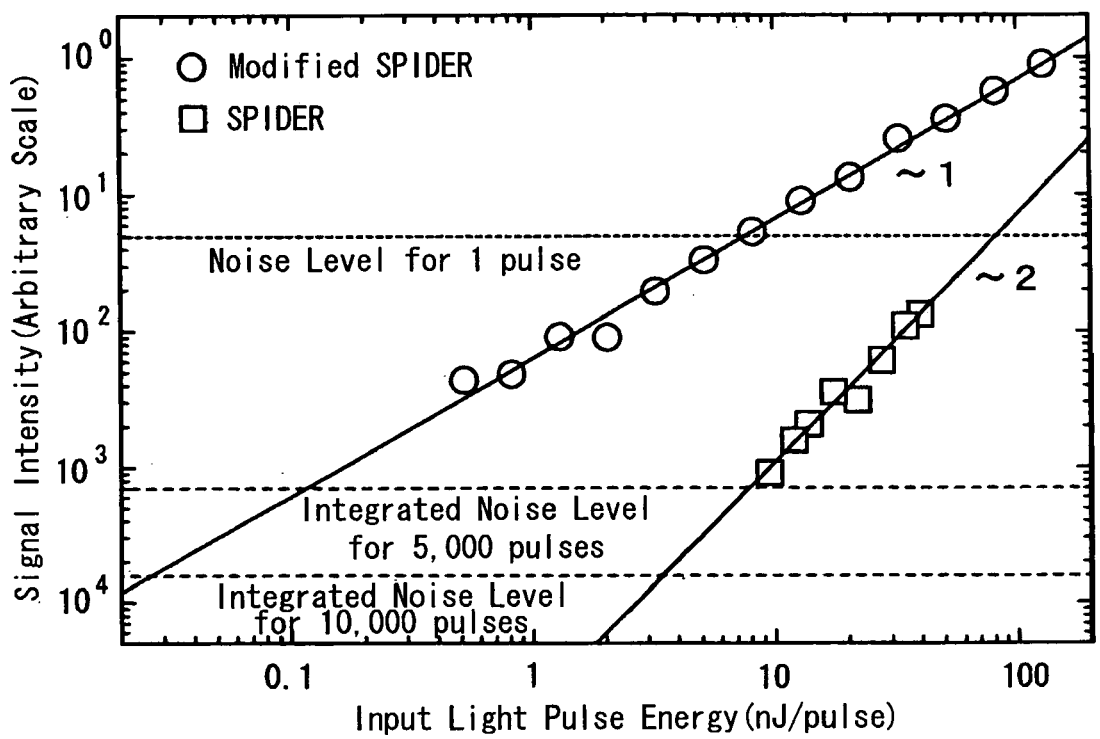

FIG. 10 graphically compares SPIDER signal intensities D ( ) as in the modified and conventional SPIDER methods, respectively, wherein FIG. 10(a) is a graph plotting input light pulse energy along the abscissa axis and SPIDER signal intensity $D(\omega)$ along the ordinate axis. Further, since integrating the interference figures of a plurality of light pulses cancels their random components due to noises to reduce noise level, there are also indicated three noise levels where there is only one pulse, where 5,000 pulses are integrated and where 100,000 pulses are integrated, respectively. The signal intensity of noise level is the detection limit. FIG. 10(b) is a table which shows detection limits of the energy of the input light pulse for different numbers of these integrated light pulses according to the modified SPIPDER method as well as respective factors of its sensitivity improvement over the conventional SPIDER method for these numbers of integrated light pulses. The chirped light pulses used in the modified SPIDER method were light pulses of 800 nm and 1.2 µJ independent of input light pulses in energy, while the chirped light pulses used in the conventional SPIDER method were light pulses resulting from splitting the input light pulses at a given percentage. These input light pulses used were test light pulses 1 passed through the ND filter at various attenuation factors.

As is apparent from FIG. 10(a), it is seen that the signal intensity as with the modified SPIDER method is proportional to the 1st power of the input light pulse energy while the signal intensity in the conventional SPIDER method is proportional to the 2nd power of the input light pulse energy. It is also seen that for a given amount of input light pulse energy the signal intensity in the modified SPIDER method is greater than the signal intensity in the conventional SPIDER method, and it is shown in FIG. 10(b) that the sensitivity improvement factor reaches 10 times for a single pulse, 80 times for 5,000 integrated light pulses and 100 times for 100,000 integrated light pulses. From FIG. 10, it is thus seen that the modified SPIDER method makes it possible to detect spectral phases of light pulses in a low energy range in which it has been impossible to detect with the conventional SPIDER method.

Figure 11:
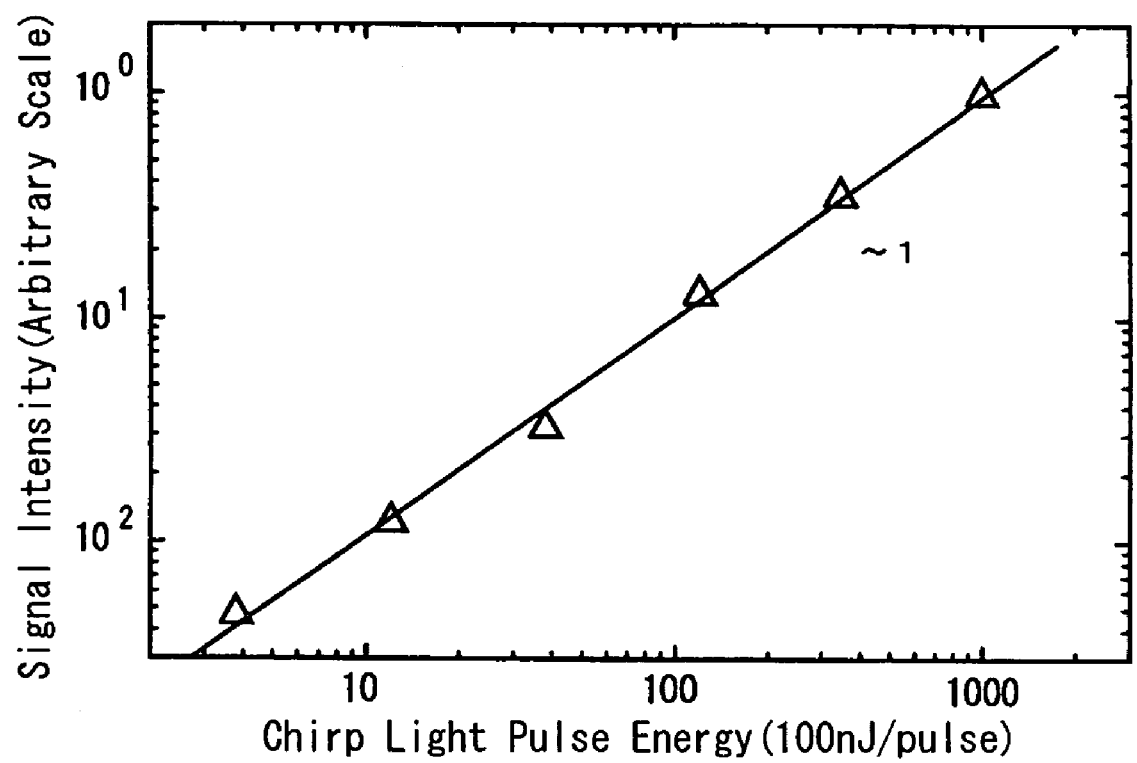
FIG. 11 is a graph showing dependency of the signal intensity in the modified SPIDER method on the chirped light pulse energy.

FIG. 11 is a graph showing that the signal intensity in the modified SPIDER method is dependent on the chirped light pulse energy. As is apparent from the graph, the signal intensity increases in proportion to the 1st power of the chirped light pulse energy. It is thus seen that the modified SPIDER method by increasing the chirped light pulse energy allows finding the spectral phase of a light pulse that is extremely small in energy. However, increasing the chirped light pulse energy excessively magnifies the self-phase modulation effect of a nonlinear optical crystal and thereby brings about a phenomenon that the noise level becomes higher.

Figure 12:
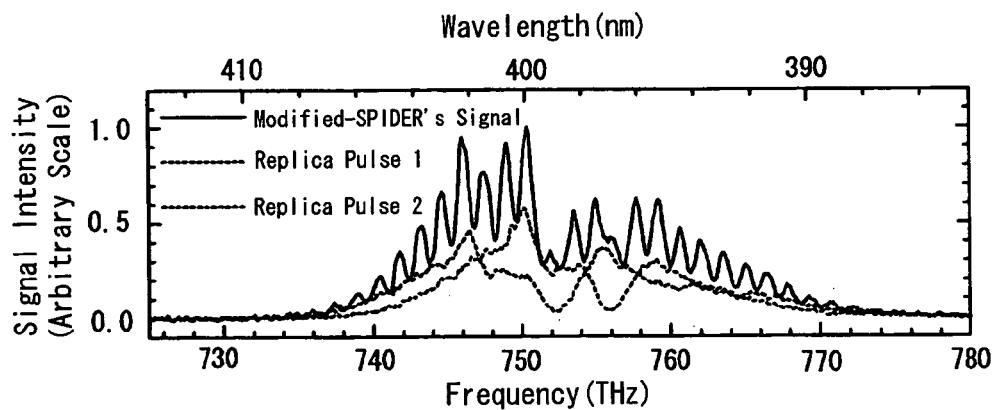
FIG. 12 graphically shows reconstructing a broadband light pulse according to the modified SPIDER method wherein FIG. 12 (a) shows Fourier spectra of replica light pulses 1 and 2, and the modified SPIDER signal.
Figure 12:
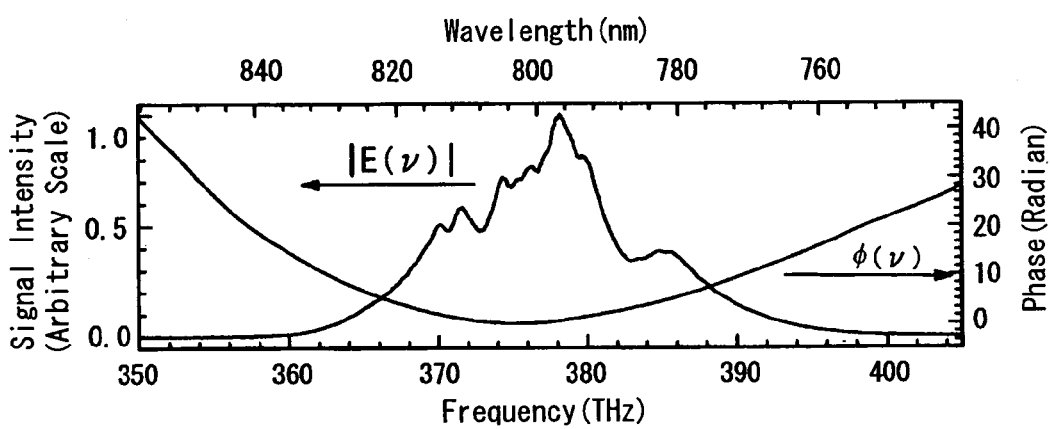
Figure 12:
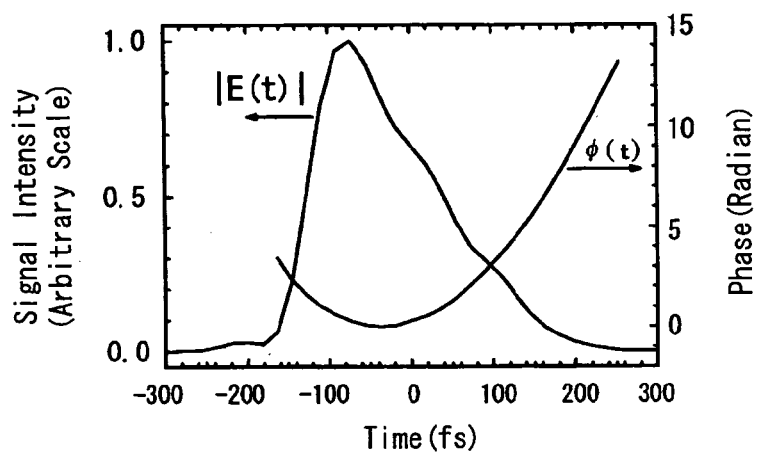

FIG. 12 graphically shows reconstructing a broadband light pulse according to the modified SPIDER method wherein FIG. 12 (a) shows Fourier spectra of replica light pulses 1 and 2, and a modified SPIDER signal; FIG. 12(b) shows a spectral phase $\phi(v)$ reconstructed by using the modified SPIDER signal, and spectral intensity $|E(v)|$ of the input light pulse; and FIG. 12(c) shows intensity $|E(t)|$ and phase $\phi(t)$ of the input light pulse in time domain, reconstructed from $\phi(v)$ and $|E(v)|$. The input light pulse used was a test light pulse 3 having a central wavelength of 800 nm, a bandwidth $\Delta f=20$ THz and a small energy amount of 3.6 nJ. It has been found that the temporal waveform and phase shown in FIG. 12(c) agree very well with the results obtained by other measurement method. As is apparent from FIG. 12, it is seen that the modified SPIDER method allows reconstructing a light pulse even if it is of broadband and very small in energy.

Figure 13:
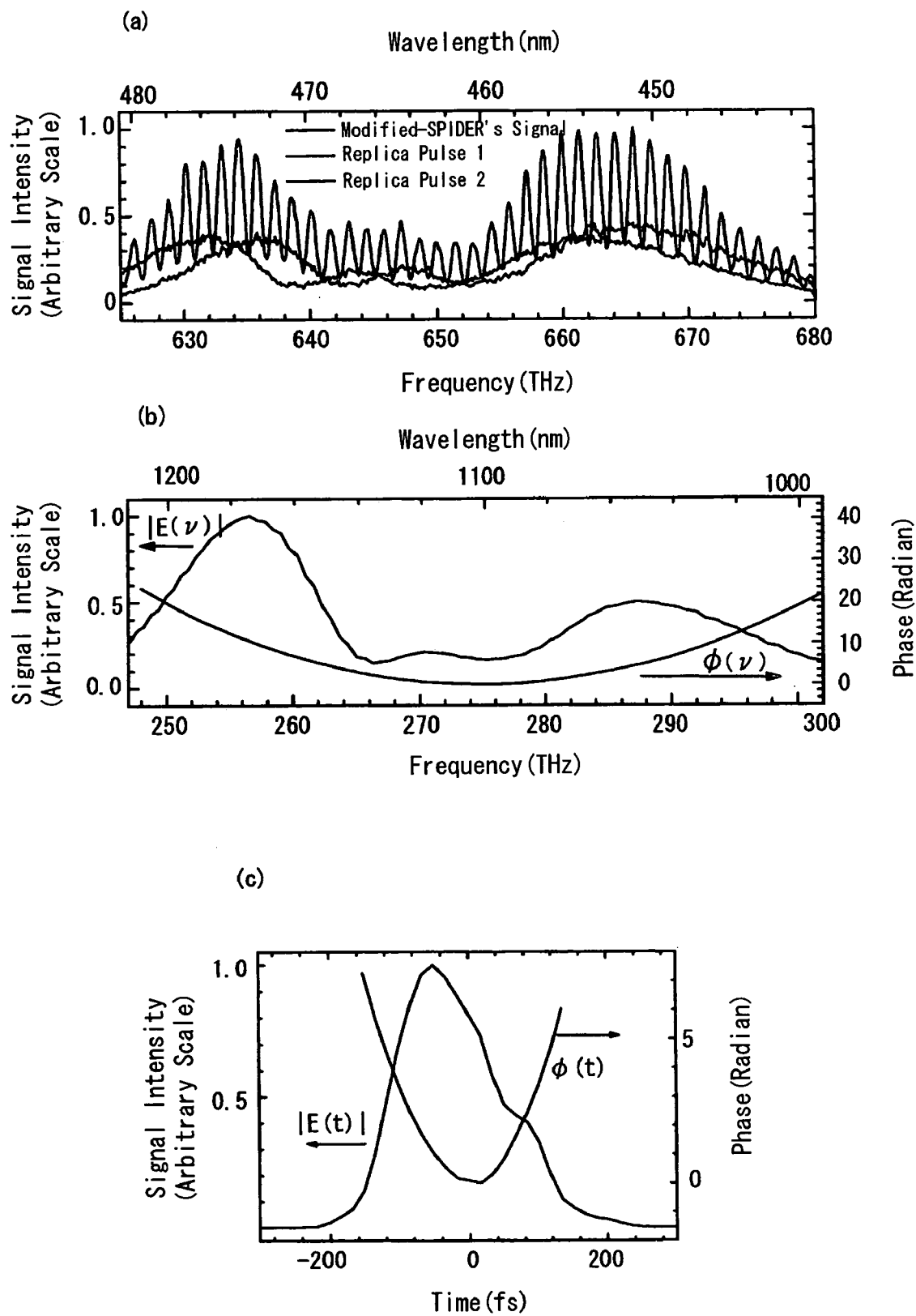
FIG. 13 graphically shows reconstructing another ultra-broadband light pulse according to the modified SPIDER method wherein FIG. 13 (a) shows Fourier spectra of replica light pulses 1 and 2, and a modified SPIDER signal.

FIG. 13 graphically shows reconstructing another ultra-broadband light pulse according to the modified SPIDER method wherein FIG. 13 (a) shows Fourier spectra of replica light pulses 1 and 2, and a modified-SPIDER signal; FIG. 13(b) shows a spectral phase $\phi(v)$ reconstructed by using the modified-SPIDER signal, and spectral intensity $|E(v)|$ of the input light pulse; and FIG. 13(c) shows intensity $|E(t)|$ and phase $\phi(t)$ of the input light pulse in time domain reconstructed from $\phi(v)$ and $|E(v)|$. The input light pulse used was a test light pulse 4 having a central wavelength of 1100 nm, a bandwidth $\Delta f=50$ THz and a small energy amount of 14 nJ. It has been found that the temporal waveform and phase shown in FIG. 13(c) agree very well with the results obtained by other measurement method. As is apparent from FIG. 13 it is seen that the modified SPIDER method allows reconstructing a light pulse even if it is of ultrabroadband and very small in energy.

Next, an example is shown of waveform-shaping an ultrashort light pulse by using the apparatus of the present invention.

Figure 14:
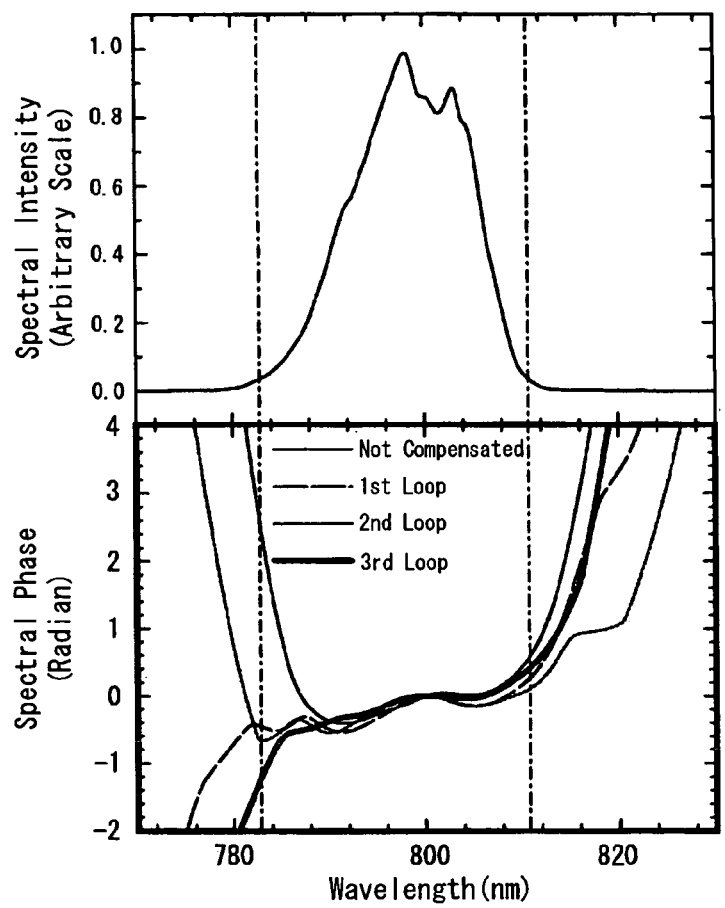
FIG. 14 graphically shows an example of waveform-shaping an ultrashort light pulse.
Figure 14:
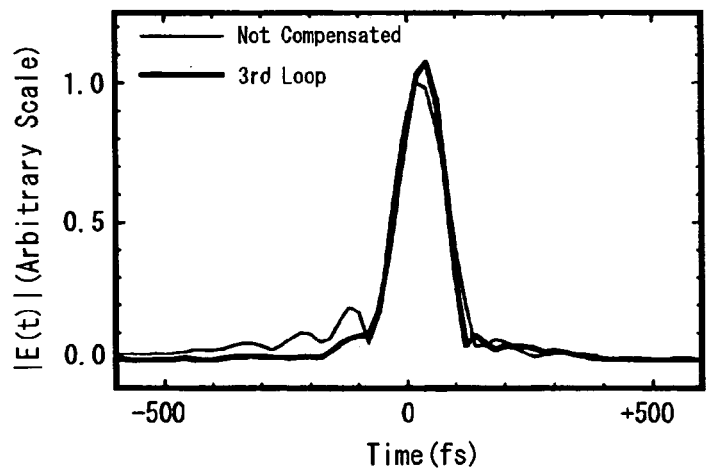

FIG. 14 graphically shows such an example of waveform-shaping an ultrashort light pulse wherein FIG. 14(a) gives in its upper part a graph showing spectral intensity $|E(\lambda)|$ measured of an input light pulse and in its lower part a graph showing spectral phase $\phi(\lambda)$ measured by the modified SPIDER method, and FIG. 14(b) shows the waveforms in time domain of an output light pulse before and after waveform-shaping. The input light pulse used was a test light pulse 1 (having a central wavelength of 800 nm, a repetition rate of 1 kHz, a bandwidth $\Delta f=10$ THz and an amount of energy of 200 nJ/pulse) and the chirped light pulse used had 4.2 µJ/pulse.

As shown in FIG. 14(b), the input light pulse in addition to its main peak has a plurality of auxiliary peaks in time domain damping gradually along its sleeves. While such auxiliary peaks of an ultrashort light pulse may be harmful depending on its use, a measure has been taken in this embodiment of the present apparatus to eliminate such auxiliary peaks by phase compensation.

In the lower graph of FIG. 14(a), the spectral phase of the input light pulse, namely that of the output light pulse having had no phase compensation, is indicated by the solid line. Indicated by the broken line is the output light spectral phase after having had a first phase compensation loop designed to phase-compensate for a difference between this spectral phase and a spectral phase where the auxiliary peaks are eliminated as desired, namely a preset spectral phase. Further, indicated by the dotted line is the output light spectral phase after having had a second phase compensation loop designed to phase-compensate a difference between the output light spectral phase after accomplishing the first phase compensation loop and the preset spectral phase. Further, indicated by the thick line is the output light spectral phase after having had a third phase compensation loop designed to phase compensate a difference between the output light spectral phase after accomplishing the second phase compensation loop and the preset spectral phase.

As shown in FIG. 14(b), after the third phase compensation loop there was obtained an ultrashort light pulse having had no auxiliary peak in time domain.

The time period required to accomplish the first phase compensation loop included 0.1 to 10 seconds expended for the interference image produced by the spectrometer to be converted by a CCD to digital data, a time period for computation of 0.3 second to reconstruct the spectral phase from the digital data and then to derive the difference from the preset phase, and 0.8 second for controlling the spatial light modulator on the basis of this differential phase.

From FIG. 14 it is seen that the apparatus of the present invention permits giving rise to a waveform shaped as desired in an extremely short period of time.

INDUSTRIAL APPLICABILITY

As will be appreciated from the foregoing description, the present invention makes it possible to autonomously compress, phase-compensate and waveform-shaping an ultrashort light pulse even where a usual laser light source is used that is low in light intensity or large in temporal phase fluctuation. Accordingly, the present invention is very useful when used in the elucidation of a natural law and creating of a new technology by using an ultrashort light pulse, in a variety of processes of modulation spectroscopy and optical communication using an ultrashort light pulse phase compensation technique and in the elucidation of an elementary chemical reaction process and a biological reaction mechanism by using an ultrashort light pulse waveform shaping technique.

What is claimed is:

1. An autonomous ultrashort light pulse compression, phase compensation and waveform shaping apparatus, characterized in that it comprises:
    a pulsed light source;
    a spectroscopic spatial dispersing device for spatially dispersing a light pulse emitted from the pulsed light source into spectral components thereof;
    a spatial light modulator for adding a phase to each of the spectral components of the spatially dispersed light pulse;
    a multiplexer for combining the phase added spectral components of the light pulse together to form a composite output light pulse;
    a modified SPIDER device for forming a spectral interference figure from a portion of the composite output light pulse; and
    a feedback device for detecting a spectral phase from the spectral interference figure and feeding a signal representing a difference between the detected spectral phase and a pre-established phase back to said spatial light modulator.

2. An autonomous ultrashort light pulse compression, phase compensation and waveform shaping apparatus as set forth in claim 1, characterized in that said modified SPIDER device comprises:
    a pulsed light source for a chirped light pulse;
    a delay unit for delaying a light pulse from the pulsed light source with an adjustable delay time;
    an optical dispersive medium for forming a frequency chirped light pulse from the light pulse whose delay time is adjusted by the delay unit;
    a replica pulse former for forming from a portion of said output light pulse a pair of replica light pulses one delayed after the other;
    a nonlinear optical crystal for frequency-mixing the two replica pulses with the chirped light pulse;
    a spectrometer for forming an interference figure of the two frequency-mixed replica light pulses from said nonlinear optical crystal; and
    an image reader for reading the interference figure of said two replica light pulses.

3. An autonomous ultrashort light pulse compression, phase compensation and waveform shaping apparatus as set forth in claim 1, characterized in that said pulsed light source includes a nonlinear optical dispersive medium, transmitting through which, a light pulse generated by the light source is broad-banded to form the light pulse.

4. An autonomous ultrashort light pulse compression, phase compensation and waveform shaping apparatus as set forth in claim 2, characterized in that said optical dispersive medium comprises a $TF_5$ glass that excels in group velocity dispersion.

5. An autonomous ultrashort light pulse compression, phase compensation and waveform shaping apparatus as set forth in claim 2, characterized in that said nonlinear optical crystal comprises a BBO crystal that excels in secondary nonlinear optical effect.

6. An autonomous ultrashort light pulse compression, phase compensation and waveform shaping apparatus as set forth in claim 2, characterized in that said image reader comprises an ICCD.

7. An autonomous ultrashort light pulse compression, phase compensation and waveform shaping apparatus comprising:
    a pulsed light source:
    said pulsed light source includes an optical nonlinear dispersive medium, transmitting through which, a light pulse generated by the pulsed light source is broad-banded to form the light pulse,
    a spectroscopic spatial dispersing device for spatially dispersing a light pulse emitted from the pulsed light source into spectral components thereof;
    a spatial light modulator for adding a phase to each of the spectral components of the spatially dispersed light pulse;
    a multiplexer for combining the phase added spectral components of the light pulse together to form a composite output light pulse;
    a modified SPIDER device for forming a spectral interference figure from a portion of the composite output light pulse; and
    a feedback device for detecting a spectral phase from the spectral interference figure and feeding a signal representing a difference between the detected spectral phase and a pre-established phase back to said spatial light modulator, wherein said modified SPIDER device comprises:
    a pulsed light source for chirped light pulse;
    a delay unit for delaying a light pulse from the pulsed light source with an adjustable delay time;
    an optical dispersive medium for forming a frequency chirped light pulse from the light pulse whose delay time is adjusted by the delay unit;
    a replica pulse former for forming from a portion of said output light pulse a pair of replica light pulses one delayed after the other;
    a nonlinear optical crystal for frequency-mixing the two replica pulses with the chirped light pulse;
    a spectrometer for forming an interference figure of the two frequency-mixed replica light pulses from said nonlinear optical crystal; and
    an image reader for reading the interference figure of said two replica light pulses.

8. An autonomous ultrashort light pulse compression, phase compensation and waveform shaping apparatus as set forth in claim 7, characterized in that said optical dispersive medium comprises a $TF_5$ glass that excels in group velocity dispersion.

9. An autonomous ultrashort light pulse compression, phase compensation and waveform shaping apparatus as set forth in claim 7, characterized in that said nonlinear optical crystal comprises a BBO crystal that excels in secondary nonlinear optical effect.

10. An autonomous ultrashort light pulse compression, phase compensation and waveform shaping apparatus as set forth in claim 7, characterized in that said image reader comprises an ICCD.

* * * * *